United States Patent
Herden et al.

(10) Patent No.: US 9,522,667 B2
(45) Date of Patent: Dec. 20, 2016

(54) BRAKE FORCE DETECTION FOR DYNAMIC BRAKES OF A RAIL VEHICLE

(75) Inventors: Marc-Oliver Herden, Munich (DE); Rainer Rau, Geretsried (DE); Andreas Trinkberger, Taufkirchen (DE)

(73) Assignee: KNORR-BREMSE SYSTEME FÜR SCHIENENFAHRZEUGE GMBH, Munich (DE)

( * ) Notice: Subject to any disclaimer, the term of this patent is extended or adjusted under 35 U.S.C. 154(b) by 29 days.

(21) Appl. No.: 14/342,419

(22) PCT Filed: Sep. 7, 2012

(86) PCT No.: PCT/EP2012/067567
§ 371 (c)(1),
(2), (4) Date: Apr. 16, 2014

(87) PCT Pub. No.: WO2013/034731
PCT Pub. Date: Mar. 14, 2013

(65) Prior Publication Data
US 2014/0229058 A1    Aug. 14, 2014

(30) Foreign Application Priority Data
Sep. 9, 2011   (DE) .......................... 10 2011 113 086

(51) Int. Cl.
*G05D 1/00* (2006.01)
*G06F 7/00* (2006.01)
*B60T 17/22* (2006.01)

(52) U.S. Cl.
CPC .............. *B60T 17/22* (2013.01); *B60T 17/228* (2013.01)

(58) Field of Classification Search
CPC combination set(s) only.
See application file for complete search history.

(56) References Cited

U.S. PATENT DOCUMENTS 2,176,748 A * 10/1939 Schoepf ................... B61H 7/08
                                                          188/159
2,323,413 A *  7/1943 Ogden ...................... B60L 7/24
                                                          188/159

(Continued)

FOREIGN PATENT DOCUMENTS

CN      101541606 A    9/2009
DE         4242392 A1  6/1994

(Continued)

OTHER PUBLICATIONS

International Preliminary Report on Patentability and Written Opinion of the International Search Authority for International Patent Application No. PCT/EP2012/067567, dated Sep. 7, 2012.

(Continued)

*Primary Examiner* — Bhavesh V Amin
(74) *Attorney, Agent, or Firm* — Barnes & Thornburg LLP

(57) ABSTRACT

A control device for a rail vehicle, the rail vehicle having a braking system with at least one dynamic braking device and at least one further braking device. The control device determines the brake force exerted by the dynamic braking device during braking based on deceleration data, which represent an overall deceleration of the rail vehicle, tractive resistance data, which represent a tractive resistance of the rail vehicle, and braking data, which represent a brake force exerted by the at least one further braking device. Also disclosed is a braking system having the control device, a rail vehicle, and a corresponding method.

9 Claims, 1 Drawing Sheet

(56) References Cited

U.S. PATENT DOCUMENTS

| | | | | |
|---|---|---|---|---|
| 3,730,596 A | * | 5/1973 | Felix | B60T 13/74 188/151 R |
| 4,042,810 A | * | 8/1977 | Mosher | G09B 9/04 105/61 |
| 4,356,773 A | * | 11/1982 | van Eyken | B61D 15/12 105/162 |
| 4,735,385 A | * | 4/1988 | Nickles | B60T 13/665 105/62.1 |
| 5,146,853 A | * | 9/1992 | Suppes | B60L 13/10 104/138.2 |
| 5,215,154 A | * | 6/1993 | Kirby | G01G 19/03 177/136 |
| 5,615,933 A | * | 4/1997 | Kidston | B60L 3/102 180/65.1 |
| 5,668,414 A | * | 9/1997 | Takahashi | H02P 9/04 290/1 E |
| 5,862,891 A | * | 1/1999 | Kroger | B60T 13/748 105/77 |
| 5,992,950 A | * | 11/1999 | Kumar | B60L 7/22 290/3 |
| 6,027,181 A | * | 2/2000 | Lewis | B60T 13/665 303/20 |
| 6,332,106 B1 | * | 12/2001 | Hawthorne | B61L 27/0055 324/160 |
| 6,364,072 B1 | * | 4/2002 | Grupp | B61H 7/08 188/165 |
| 6,619,760 B1 | * | 9/2003 | Anwar | B60T 13/748 188/159 |
| 6,648,108 B2 | * | 11/2003 | Grupp | B61H 7/08 188/165 |
| 6,760,712 B1 | * | 7/2004 | Bonissone | B61L 27/0055 701/19 |
| 6,922,619 B2 | * | 7/2005 | Baig | B60L 15/32 303/16 |
| 6,953,107 B2 | * | 10/2005 | Lehmann | B61H 7/08 188/165 |
| 7,273,135 B2 | * | 9/2007 | Aisenbrey | B29C 45/0013 188/164 |
| 8,025,131 B1 | * | 9/2011 | Boren | A63G 21/22 188/165 |
| 8,033,365 B2 | * | 10/2011 | Kassan | B61H 7/08 188/165 |
| 8,237,384 B2 | * | 8/2012 | Tarnow | B60L 7/006 318/362 |
| 2002/0185343 A1 | * | 12/2002 | Wedge | B60T 7/16 188/162 |
| 2004/0093196 A1 | * | 5/2004 | Hawthorne | B61L 3/125 703/8 |
| 2004/0181317 A1 | * | 9/2004 | Flechtner | G01G 19/086 701/1 |
| 2005/0006948 A1 | * | 1/2005 | Friesen | B60T 8/1705 303/20 |
| 2005/0191788 A1 | * | 9/2005 | Aisenbrey | H02K 49/04 438/106 |
| 2005/0205712 A1 | * | 9/2005 | Aisenbrey | B29C 45/0013 242/422.2 |
| 2006/0243857 A1 | * | 11/2006 | Rado | B60T 8/1703 244/111 |
| 2007/0095245 A1 | * | 5/2007 | Li | B60L 13/04 104/284 |
| 2007/0233335 A1 | * | 10/2007 | Kumar | B61L 3/006 701/22 |
| 2007/0272116 A1 | * | 11/2007 | Bartley | B60L 7/22 105/35 |
| 2009/0048755 A1 | * | 2/2009 | Tokimasa | B60K 31/00 701/94 |
| 2011/0109326 A1 | * | 5/2011 | Lehmann | B60T 17/228 324/656 |
| 2014/0190512 A1 | * | 7/2014 | Elstorpff | B61H 7/08 134/1 |

FOREIGN PATENT DOCUMENTS

| | | |
|---|---|---|
| DE | 195 10 755 A1 | 10/1996 |
| DE | 19510755 A1 | 10/1996 |
| DE | 102006057065 A1 | 6/2008 |
| EP | 2226226 A2 | 9/2010 |
| JP | H0539019 A | 2/1993 |
| JP | 2001028803 A | 1/2001 |
| JP | 2009095077 A | 4/2009 |
| JP | 2009296733 A | 12/2009 |
| WO | 0249897 A1 | 6/2002 |

OTHER PUBLICATIONS

English Translation of International Preliminary Report on Patentability and Written Opinion of the International Search Authority for International Patent Application No. PCT/EP2012/067567, dated Sep. 7, 2012.

Search Report for International Patent Application No. PCT/EP2012/067567; Mar. 8, 2013.

Chinese Office Action for Chinese Patent Application No. 201280043999.7, dated Aug. 3, 2015, along with Partial English Translation.

Japanese Office Action for Corresponding Japanese Application No. 2014-529002, dated Sep. 5, 2016.

* cited by examiner

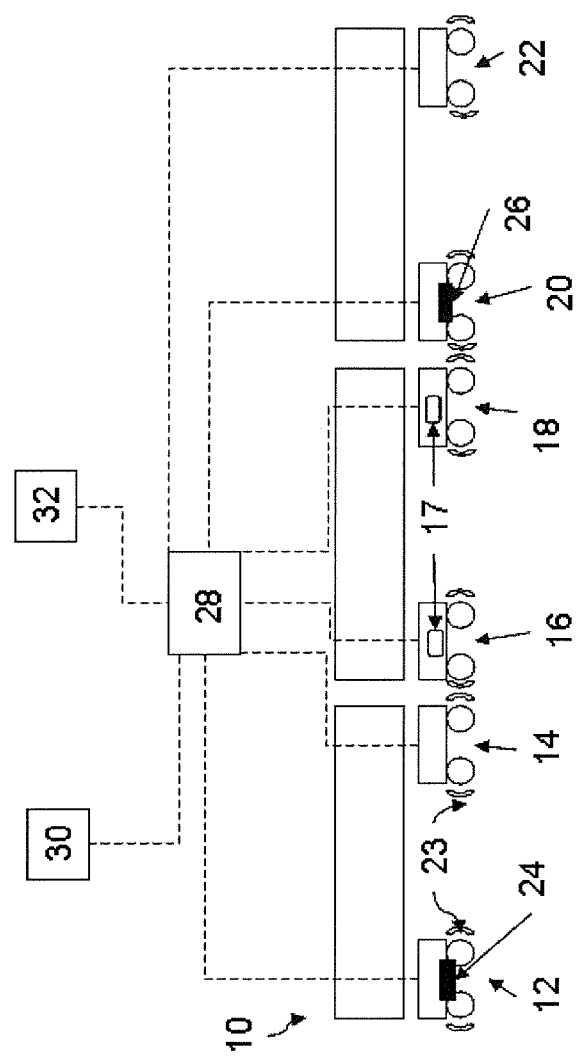

BRAKE FORCE DETECTION FOR DYNAMIC BRAKES OF A RAIL VEHICLE

PRIORITY CLAIM

This patent application is a U.S. National Phase of International Patent Application No. PCT/EP2012/067567, filed 7 Sep. 2012, which claims priority to German Patent Application No. 10 2011 113 086.5, filed 9 Sep. 2011, the disclosures of which are incorporated herein by reference in their entirety.

FIELD

Disclosed embodiments relate to a control device for a rail vehicle comprising a brake system, to a brake system, to a rail vehicle, and also to a method for determining a braking force which is exerted by a dynamic brake device.

BACKGROUND

Modern rail vehicles have brake systems comprising brake devices which act in different ways. The service brake devices provided are often, for example, pressure-operated brake devices, in particular pneumatic brake devices. Dynamic brakes, such as electrodynamic brakes, rotating eddy-current brakes or hydrodynamic brakes for example, are additionally used to assist service braking. Dynamic brake devices comprise adhesion-dependent brakes, the braking force of the adhesion-dependent brakes being transmitted to the rail by means of contact between wheel and rail. Therefore, the brakes interact in a critical manner with conventional, likewise adhesion-dependent service brakes. In contrast, brakes of which the braking force is transmitted between wheel and rail independently of adhesion are generally called adhesion-independent brakes. One example of an adhesion-independent brake is a magnetic track brake which can produce its own direct frictional contact with the rail and transmit a braking force by means of the frictional contact. To be able to estimate and control the effect of dynamic brakes of this kind in a braking process, in particular to avoid a wheel being excessively braked in the case of interaction with other adhesion-dependent brakes, it is necessary to detect the braking force which is exerted by dynamic brakes. The sensor system associated with this is complex and expensive.

Disclosed embodiments provide an efficient and cost-effective way of determining the braking force of dynamic brakes.

BRIEF DESCRIPTION OF THE FIGURES

Disclosed embodiments will be explained by way of example with reference to the accompanying drawing, in which:

FIG. 1 shows a rail vehicle comprising a brake system.

DETAILED DESCRIPTION OF THE DISCLOSED EMBODIMENTS

Disclosed embodiments relate to a control device for a rail vehicle, wherein the rail vehicle has a brake system comprising at least one dynamic brake device and at least one further brake device. The control device is designed to determine a braking force which is exerted during a braking operation by the dynamic brake device on the basis of deceleration data which represents total deceleration of the rail vehicle, on the basis of traveling resistance data which represents a traveling resistance of the rail vehicle, and brake data which represents a braking force which is exerted by the at least one further brake device. Therefore, data which is available in respect of braking by other vehicle systems can be used to determine the braking force which is exerted by the dynamic brake device. Therefore, special sensors for detecting the braking force which is exerted by the at least one dynamic brake device can be saved. As an alternative or in addition, provision can be made for a braking force which is detected by braking force sensors of the dynamic brake device to be compared with a braking force which is determined on the basis of the deceleration data, the traveling resistance data and the brake data, for example to carry out a plausibility check, calibration and/or standardization. The control device can be designed to determine the braking force which is exerted by the at least one dynamic brake device on the basis of at least one vehicle parameter and/or a vehicle speed. A vehicle parameter can represent, for example, a vehicle mass and/or a vehicle load. A dynamic brake device can be, in particular, an adhesion-dependent brake device which transmits a braking force by means of wheel/rail contact. A dynamic brake device can comprise, in particular, at least one electrodynamic brake, a rotating eddy-current brake and/or a hydrodynamic brake. The at least one further brake device can comprise an adhesion-dependent or an adhesion-independent brake device which is not to be counted amongst the dynamic brake devices. A friction brake device, such as a block brake, disk brake or combined block/disk brake for example, can be provided as an adhesion-dependent further brake device. A friction brake device can be a pressure-operated brake device, for example a pneumatic or hydraulic friction brake device. A track brake, in particular a magnetic track brake or linear eddy-current brake, or an aerodynamic brake can be provided as an adhesion-independent brake device. In general, a brake device can have one or more brakes which can be provided for the purpose of braking different wheel axles and/or bogies. In this case, the brakes of a brake device can be of the same type. The several brakes can be actuated separately. One or more non-dynamic brake devices of this kind can be provided. In general, data which represents a variable or a state can directly specify this variable or this state. It is also conceivable for the corresponding variable or the corresponding state to be determined on the basis of data of this kind, for example by carrying out transformations and/or calculations. A variable can be, for example, a braking force which is exerted by a brake device. A traveling resistance can describe a state which can be mapped onto a braking force. The control device can be designed to carry out corresponding calculations and/or transformations. The control device can have one or more components. It is conceivable for the control device to be a brake computer or a train computer or to have devices of this kind as components. It is conceivable for the control device to be designed to receive deceleration data, traveling resistance data and/or brake data. The data can be provided by suitable sensor devices and/or control devices and/or can be transmitted to the control device. Total deceleration of the rail vehicle during a braking operation can relate to the reduction in speed which is achieved by virtue of the braking operation and/or a total braking force which is exerted for the purpose of decelerating the vehicle. Traveling resistance data can relate to a traveling resistance of the rail vehicle, which traveling resistance can occur, for example, by virtue of an air resistance and/or a path resistance, in particular on an upward slope. Traveling resistance data can relate, in particular, to an air resistance and/or a rolling resistance and/or loads which are driven by wheels which run on the rail, and/or a breaking-free resistance during start-up and/or a curve resistance when traveling around a bend and/or a resistance on an upward slope or downward slope and/or acceleration or braking resistances. A traveling resistance and/or traveling resistance data can be ascertained on the basis of measurements by sensors, experiments, simulations and/or models. A traveling resistance or corresponding data can be determined on the basis of or taking into account the Sauthoff formula. Brake data can relate to a braking force which is exerted on the rail vehicle and which is exerted by one or more further brake devices of the rail vehicle. In this case, a braking force is generally understood to mean a force which causes deceleration of the vehicle and/or an associated wheel in relation to the rail. When the total deceleration and all relevant braking influences apart from the braking force which is exerted by the dynamic brake device are known, provision can be made for the braking force which is exerted by the dynamic brake device to be ascertained by subtracting the individual braking forces which are determined from the deceleration data, traveling resistance data and brake data from the total braking force. In this case, it is assumed that the braking forces which act on the vehicle, with the exception of the braking force which is exerted by the dynamic brake device, can be determined from the traveling resistance data and brake data. A rail vehicle can have one or more carriages. A carriage can be a driven carriage or may not be equipped with a drive. It is conceivable for a rail vehicle or a carriage to have one or more bogies on which wheel axles of the vehicle can be provided. A sensor device can have one or more sensors. Provision can be made for a sensor device to comprise a control device which can be designed, in particular, to evaluate and/or process measurement data from sensors. A sensor device can be connected or connectable to the control device for the purpose of data transmission.

The at least one further brake device can comprise a friction brake device, in particular a pressure-operated friction brake device. The friction brake device can be provided as a service brake. A pressure-operated friction brake device can be, for example, a pneumatic, electropneumatic, electrohydraulic or hydraulic friction brake device. In a pressure-operated friction brake device, a braking pressure is converted into an operating force by force generators, the operating force bringing frictional elements of the friction brake device into frictional contact for the purpose of braking a wheel or a wheel axle.

The friction brake device can have an associated braking force sensor device which can detect brake data which represents a braking force which is exerted by the friction brake device. The braking force sensor device advantageously measures the braking force actually exerted by the friction brake device and/or a braking torque which is exerted by the friction brake device, to provide the braking force and/or braking torque as brake data. A sensor device of this kind can have sensors which are each arranged within a mechanical force flow which is generated by a braking operation, to measure deformation of components of the rail vehicle, which components are fitted to a bogie, due to the braking force. This allows accurate detection of the braking force which is exerted by the friction brake device. As an alternative or in addition, it is conceivable for a pressure-operated friction brake device to be monitored by means of a braking pressure sensor device. In general, conclusions can be drawn at least indirectly about an operating force and/or a braking force from a braking pressure.

The at least one further brake device can comprise at least one brake device which is independent of the force flow, in particular a magnetic track brake device and/or a linear eddy-current brake device.

The at least one adhesion-independent brake device can have an associated braking force sensor device which can detect brake data which represents a braking force which is exerted by the at least one adhesion-independent brake device. It is conceivable for a sensor device to be provided for detecting the current flowing through the eddy-current brake device or the magnetic track brake device for the purpose of detecting the braking force which is generated by the magnetic track brake device and/or the linear eddy-current brake device. Provision may also be made for, in particular, a magnetic track brake device to have an associated braking force sensor device which can detect a braking force which is exerted by the magnetic track brake device. A braking force sensor device of this kind can detect, for example, a mechanical response to the magnetic track brake device in the event of a braking operation which acts by exerting the braking force on the magnetic track brake device and/or its mechanical connection to a bogie or carriage structure. In general, it may be expedient when a sensor device which can detect the braking forces which are exerted by all of the further brake devices is provided. In this case, sensors for detecting the braking forces which are exerted by individual brakes of a brake device can be provided, so that optionally the braking forces which are exerted by all of the components of the at least one further brake device are detected.

The control device can be designed to determine total deceleration on the basis of vehicle speed data. The vehicle speed data can therefore be regarded as deceleration data. The profile of a vehicle speed can be used to draw conclusions about deceleration of the vehicle and therefore about an exerted total braking force, for example knowing further vehicle parameters such as vehicle mass and/or inertia of the vehicle.

The control device can be connected or connectable to at least one sensor device which has at least one acceleration sensor for determining deceleration data. The acceleration sensor can be designed, in particular, to ascertain total deceleration of the rail vehicle. It is conceivable for the control device to use an acceleration sensor, in addition to determining the total deceleration from vehicle speed data, to allow redundant determination of the total deceleration from different data which is detected independently.

The control device can be connected to one or more suitable sensor devices and/or other control devices for the purpose of receiving brake data and/or deceleration data and/or traveling resistance data and/or brake data.

Disclosed embodiments also provide a brake system comprising at least one dynamic brake device and at least one further brake device and also a control device which is described in this document.

Disclosed embodiments also provide a rail vehicle comprising a control device which is described in this document and/or a brake system which is described in this document.

Disclosed embodiments also provide a method for determining a braking force which is exerted by a dynamic brake device of a brake system of a rail vehicle during a braking operation using a control device, wherein the brake system has at least one further brake device, and wherein the control device determines the braking force which is exerted by the dynamic brake device during a braking operation on the basis of deceleration data which represents total deceleration of the rail vehicle, traveling resistance data which represents a traveling resistance of the rail vehicle, and brake data which represents a braking force which is exerted by the at least one further brake device. The control device can be a control device which is described in this document. The brake system can be a brake system which is described in this document. The at least one further brake device can comprise a friction brake device, in particular a pressure-operated friction brake device. It is conceivable for the friction brake device to have an associated braking force sensor device which can detect brake data which represents a braking force which is exerted by the friction brake device. The at least one further brake device can comprise at least one adhesion-independent brake device, in particular a magnetic track brake device and/or a linear eddy-current brake device. Provision can be made for the at least one adhesion-independent brake device to have an associated braking force sensor device which can detect brake data which represents a braking force which is exerted by the at least one adhesion-independent brake device. The control device can determine total deceleration from vehicle speed data. The control device can be connected to a sensor device which has at least one acceleration sensor for determining deceleration data.

FIG. 1 shows a rail vehicle 10 comprising a plurality of carriages. Bogies 12, 14, 16, 18, 20 and 22 are provided on the carriages. In each case two wheel axles are fitted to the bogies 12, 14, 16, 18, 20, 22, it being possible for wheels which are in contact with a rail to rotate on the wheel axles. In this example, each wheel axle has an associated pneumatically operated block brake which is illustrated symbolically as half of an arc. The block brakes are each part of a pneumatic friction brake device 23. Furthermore, magnetic track brakes 24, 26, which are symbolized as bars and can be considered to be parts of an adhesion-independent brake device, are provided on the bogies 12 and 20. In each case, a hydrodynamic brake 17 is provided on the bogies 16 and 18, which is to be considered as part of a dynamic brake device. It goes without saying that disk brakes can also be used instead of block brakes, and other types of dynamic brakes can also be used instead of hydrodynamic brakes. Each magnetic track brake 24, 26 has an associated sensor of a sensor device which can detect the braking force, which is exerted by the magnetic track brake device during a braking operation, on the basis of a mechanical deformation of components of the magnetic track brake device, and provide the braking force as brake data. Similarly, each block brake of the friction brake device has an associated braking force sensor device which can detect the braking force which is exerted by an individual friction brake device. The associated sensors are each connected to a control device 28 by means of a data transmission connection. In FIG. 1, data transmission connections are generally illustrated using dashed lines and can be cable-bound or radio connections. For reasons of clarity, only one data transmission connection is illustrated for each bogie. It goes without saying that different devices on a bogie can also be connected to the control device 28 by means of different data transmission connections. The control device 28 receives brake data, which represents the braking force which is exerted by the components or brakes of the respective brake device during a braking operation in each case, from the magnetic track brakes 24, 26 and the friction brake device 23. In general, provision is made for the brake data to represent all of the braking forces which are exerted by brake devices, with the exception of the braking forces which are exerted by the dynamic brakes. The control device 28 is further connected to a deceleration sensor device 30 by means of which it receives data which represents the total deceleration of the rail vehicle during a braking operation. The deceleration sensor device 30 can provide, in particular, data relating to the traveling speed and/or monitor the traveling speed profile. A device 32 for detecting traveling resistance data is provided. The device 32 can have a memory device in which parameters relating to a traveling resistance can be stored. Furthermore, the device 32 can have one or more acceleration sensors and/or other sensors for determining a traveling resistance. Sensors of this kind can be, for example, inclination sensors, to determine an upward slope, a downward slope or a curve and/or to detect corresponding parameters. The control device 28 can firstly determine a total braking force, which acts on the vehicle, based on its brake data which originates from the friction brake device 23 and its block brakes and also the brake data, which originates from the magnetic track brake device, deceleration data from the deceleration sensor device 30 and traveling resistance data from the device 32, and secondly can subtract braking forces which are determined on the basis of the brake data, deceleration data and traveling resistance data from the total braking force, to thereby obtain the braking force which is exerted by a dynamic brake device. FIG. 1 shows the block brakes, the magnetic track brakes 24, 26 and the dynamic brakes 70 as parts of a brake system.

The features of the invention which are disclosed in the above description, in the drawings and also in the claims may be essential for implementing the invention both individually and also in any desired combination.

LIST OF REFERENCE SYMBOLS

10 Rail vehicle
12 Bogie
14 Bogie
16 Bogie
18 Bogie
20 Bogie
22 Bogie
23 Friction brake device
24 Magnetic track brake
26 Magnetic track brake
28 Control device
30 Deceleration sensor device
32 Traveling resistance device

The invention claimed is:

1. A control device for a rail vehicle, wherein the rail vehicle has a brake system comprising at least one dynamic brake device and at least one further brake device, the control device determining a braking force, which is exerted during a braking operation by the dynamic brake device, the control device determines the braking force exerted by the dynamic brake device based on deceleration data which represents total deceleration of the rail vehicle, traveling resistance data which represents a traveling resistance of the rail vehicle, and brake data which represents a braking force which is exerted by the at least one further brake device.

2. The control device of claim 1, wherein the at least one further brake device comprises a friction brake device, in particular a pressure-operated friction brake device.

3. The control device of claim 2, wherein the friction brake device has an associated braking force sensor device which can detect brake data which represents a braking force which is exerted by the friction brake device.

4. The control device of claim 1, wherein the at least one further brake device comprises at least one adhesion-independent brake device.

5. The control device of claim 1, wherein the at least one adhesion-independent brake device has an associated braking force sensor device which detects brake data which represents a braking force which is exerted by the at least one adhesion-independent brake device.

6. The control device of claim 1, wherein the control device determines total deceleration based on vehicle speed data.

7. The control device of claim 1, wherein the control device is connected to a sensor device which has at least one acceleration sensor for determining deceleration data.

8. A method for determining, using a control device, a braking force which is exerted by a dynamic brake device of a brake system of a rail vehicle during a braking operation, wherein the brake system has at least one further brake device, the method comprising:

the control device determining the braking force which is exerted by the dynamic brake device during a braking operation based on deceleration data which represents total deceleration of the rail vehicle, traveling resistance data which represents a traveling resistance of the rail vehicle, and brake data which represents a braking force which is exerted by the at least one further brake device during the braking operation, and at least one sensor configured to sense the braking force exerted by the at least one further brake device.

9. The control device of claim 4, wherein the at least one adhesion-independent brake device is a magnetic track brake device and/or a linear eddy-current brake device.

\* \* \* \* \*